United States Patent

[11] 3,576,200

| [72] | Inventor | John A. Elmes |
| | | Canton, Ohio |
| [21] | Appl. No. | 802,488 |
| [22] | Filed | Feb. 26, 1969 |
| [45] | Patented | Apr. 27, 1971 |
| [73] | Assignee | Heinemann Saw Corporation |
| | | Canton, Ohio |

[54] CIRCULAR SAW
3 Claims, 5 Drawing Figs.

| [52] | U.S. Cl. | 143/133, 29/95 |
| [51] | Int. Cl. | B27b 33/08 |
| [50] | Field of Search | 143/133, 140; 29/95 |

[56] References Cited
UNITED STATES PATENTS

| 2,720,229 | 10/1955 | Drake | 143/140 |
| 3,309,756 | 3/1967 | Segal | 143/133X |

Primary Examiner—Donald R. Schran
Attorney—John D. Haney

ABSTRACT: A circular cutter such as a saw has its teeth arranged in pairs each consisting of a leading tooth (A) and a trailing tooth (B) which cooperate to remove five separate and distinct chips when cutting a kerf through a workpiece. Leading tooth (A) removes a wide center chip and two narrower side chips, the latter forming the resulting cut faces of the workpiece. Trailing tooth (B) removes two chips flanking the center chip. The resulting cut faces of the workpiece are remarkably smooth and are burr free so that secondary finishing and polishing operations may be omitted when cutting common aluminum, brass, copper and similar nonferrous materials.

INVENTOR.
JOHN A. ELMES
BY John D. Haney
ATTY.

INVENTOR.
JOHN A. ELMES
BY John D. Haney
ATTY.

CIRCULAR SAW

This invention relates to rotatable circular saws particularly designed to make smooth finished cut surfaces with practically burr-free edges along a workpiece. These improved saws are especially useful for cutting nonferrous industrial metals such as aluminum, copper, brass, etc. in that the use of them eliminates the necessity for secondary surface finishing and polishing operations on the cut surfaces. The invention is especially adapted to and is ordinarily practiced with saws of the class in which the cutting teeth include inserts of very hard durable material such as the carbide materials customarily used with circular saws.

BACKGROUND OF THE INVENTION

Prior to the present invention, the saws most commonly used for cutting nonferrous metals have been saws with teeth shaped by the so-called "triple-chip" grind. In these triple-chip saws, the teeth were ground to provide a series of "high" teeth separated alternately by a series of "low" teeth around the periphery of the saw. The combination of the high leading tooth and a next adjoining low trailing tooth operated in the saw kerf to remove three distinct chips from the work. Each high tooth has a radially outer cutting edge which removes a chip from the center of the kerf approximately one-third of the overall width of the kerf. The adjoining low trailing tooth then removes two chips flanking the foregoing center chip. The resulting cut surfaces are actually formed by the laterally outer corners of each low trailing tooth.

The shape of each low trailing tooth in its frontal aspect resembles substantially a keystone with the wider side forming the outer peripheral tip of these teeth. It is therefore evident that the laterally outer corners of these low trailing teeth have been necessarily formed so that they are very sharp. That is to say, the angle between the peripherally outer top surface of such teeth and the diverging lateral sides must be less than 90° and is commonly in the order of 85° or even less. Accordingly, as these corners pass over and form the cut surface on the workpiece they apparently score the cut surface of the workpiece with many curving striations thereby forming a comparatively rough-cut surface which is also characterized by burrs along the edges of the workpiece.

SUMMARY OF THIS INVENTION

According to the present invention, a circular saw is provided with alternate "high" teeth and "low" teeth, but these teeth are formed with a so-called "five-chip" grind so that the cutting action of the saw in the kerf progressively removes five distinct chips rather than three chips as in the prior art saws.

In these new saws, each leading high tooth removes three distinct chips. One of these is a chip from the center of the kerf. The other two chips removed by the leading high tooth are relatively narrow chips directly adjoining and thereby forming the cut surfaces of the workpiece. Each trailing low tooth removes two distinct chips which flank the foregoing center chip between the outside chips.

This result is accomplished by grinding or otherwise shaping the lateral outwardly diverging sides of the low teeth so they are inside the envelope of the lateral sides of the high tooth. Therefore, in these new saws the cut surfaces of the work are actually formed by the laterally spaced edges of the leading high tooth instead of the low tooth as in the triple-chip saws.

The much smoother cut surfaces on the workpiece are believed to result from the comparatively wide angle of the lateral cutting corners on each leading high tooth. Each leading high tooth in this saw in its frontal aspect is also of keystone shape but with beveled faces between its radially outer side and its lateral sidewalls which diverge toward the outer side of the tooth. Accordingly, the lateral corner of the high tooth at the junction of each beveled outer face and the lateral sidewall is always a broad obtuse angle. Consequently, the cut surfaces of the workpiece are not scored with a series of small striations but have a much cleaner smooth finish.

In other respects, the saws of this invention embody and are made in accordance with the conventional saw-making materials and techniques. The improved "five-chip" grind provided by this invention may be easily applied to carbide-tipped conventionally made saws in accordance with ordinary production techniques.

BRIEF DESCRIPTION OF DRAWINGS

The drawings show one example of a carbide-tipped saw in which the teeth are provided with this new five-chip grind. In the drawings:

Referring to FIG. 1, a saw is made with a thin circular disc 10 of traditional or conventional saw blade steel and having a series of peripheral teeth 12 of uniform shape uniformly distributed around the periphery of the disc 10. Each tooth 12 has a cutting insert marked either A or B of a very hard durable carbide material such as tungsten carbide material brazed into a complementary recess formed in the front face of each tooth 12.

According to the invention, the carbide tips A are ground or shaped to form the high leading teeth of the saw and have a radially outer cutting edge 14 projecting radially beyond the corresponding outermost cutting edge portion 15 of the trailing low teeth B.

Figure 1:
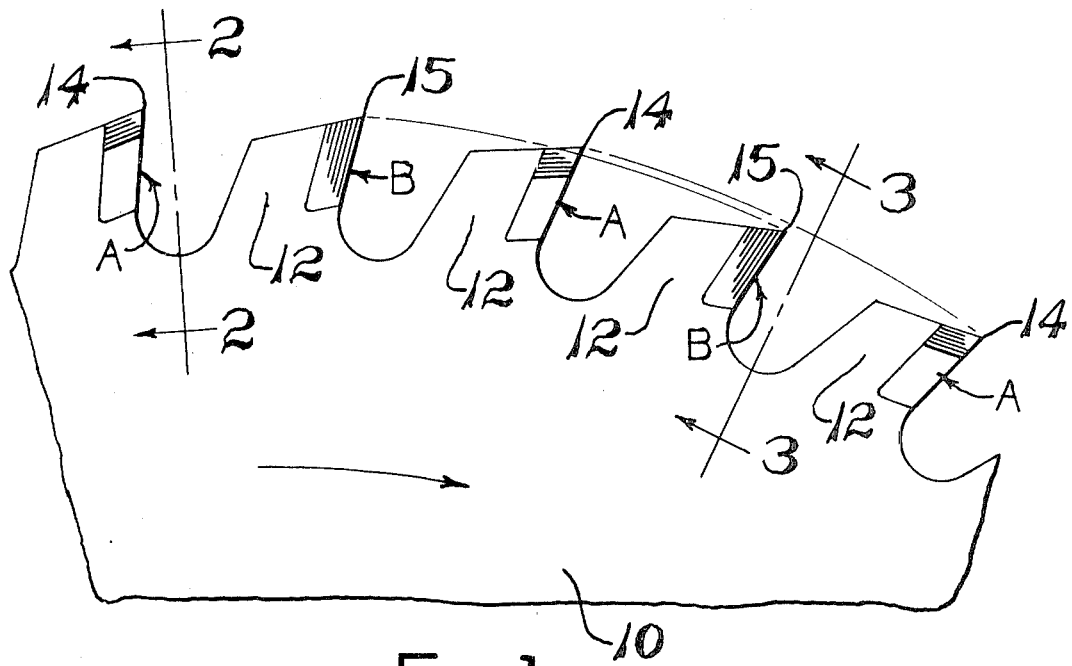
FIG. 1 is a fragmentary side view of the periphery of a saw showing the profile of the cutting teeth.
Figures 2, 3:
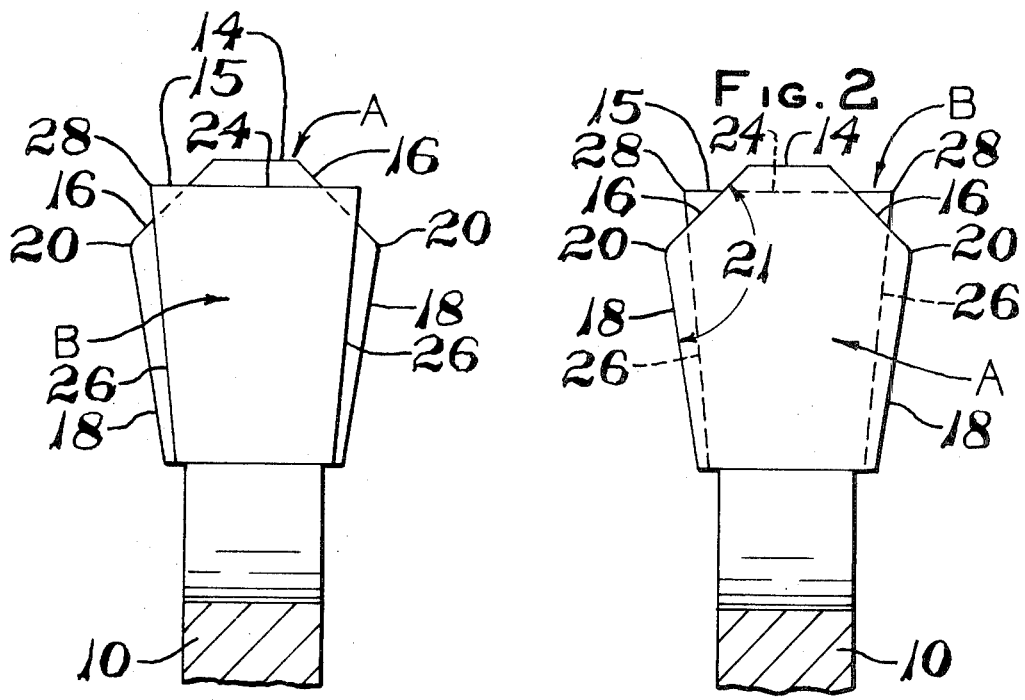
FIG. 2 is a frontal view showing particularly the frontal aspect of a leading high tooth A with a trailing low tooth B in the background, the view being taken along the line 2-2 of FIG. 1.
FIG. 3 is a view similar to FIG. 2 taken along the line 3-3 of FIG. 1 but showing the frontal aspect of the low frontal tooth B and with the leading high tooth A in the background.

Referring to FIG. 2, each leading tooth A is approximately of keystone shape with its outermost cutting edge 14 at the outer peripheral edge of the tooth. Flanking the cutting edge 14 are beveled faces 16-16 which merge with the lateral outwardly diverging sides 18-18 of the tooth. The surfaces 16 and 18 on each side of each tooth A merge at a rounded cutting corner 20 which, as hereafter explained, is the cutting edge which actually forms the cut surface on the workpiece.

When the saw is initially made, corners 20-20 actually meet at a sharp corner instead of a rounded corner as illustrated in FIGS. 2 and 3. The sharp corners are quickly rounded, however, as soon as the saw is placed in cutting service. Therefore, the rounded corners 20-20 in FIG. 2 represent the condition of each leading high tooth A during the great majority of its cutting life.

It may be noted in FIG. 2 that the angle 21 formed by the juncture of bevel faces 16 with the lateral side faces 18 is a wide obtuse angle considerably more than 90°

Referring to FIG. 3, the frontal aspect of the trailing low tooth B is essentially also of keystone shape. The radially outer face 24 which merges with the frontal face to form edge 15 of each tooth B is offset radially inward from the radially outer face forming edge 14 of the high leading teeth A. In each tooth B, the outer face 24 merges with the lateral diverging faces 26-26 to provide sharp corners 28-28. The lateral faces 26-26 of each tooth B are ground so that each is offset inwardly or is inside the envelope of the corresponding lateral sides 18-18 of the leading tooth A. Therefore, the corners 28-28 are similarly inside the envelope of the cutting edges 20-20 of the leading tooth A. The portions of the outer edge 15 of the trailing tooth B which are actually effective for cutting are the portions of edge 15 near the corners 28 which extend beyond the envelope of the leading tooth A as indicated in FIG. 2 and 3 and as will be more fully explained in connection with FIG. 4 and 5.

It is therefore evident from the foregoing description that the width of the cutting kerf in this improved saw is equal to the lateral distance between the cutting corners 20—20 of each leading tooth A.

Figure 4:
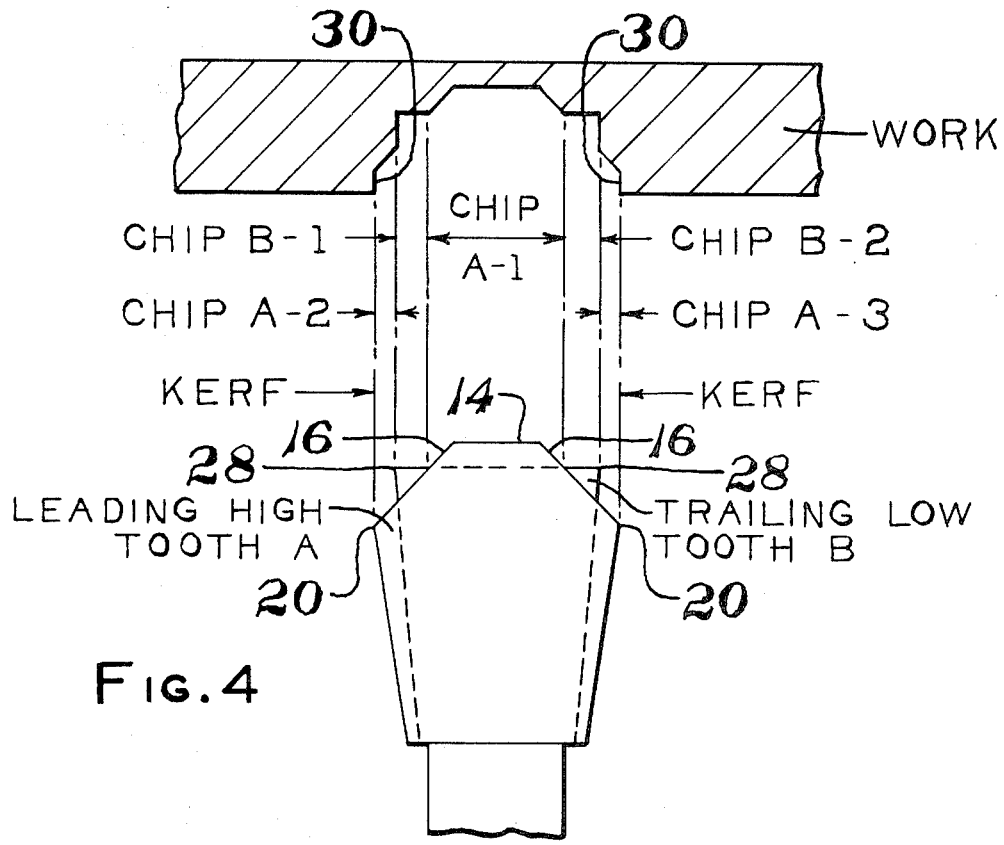
FIG. 4 is a diagram with appropriate legends to indicate the five-chip cutting action of the saw of FIG. 1.
Figure 5:
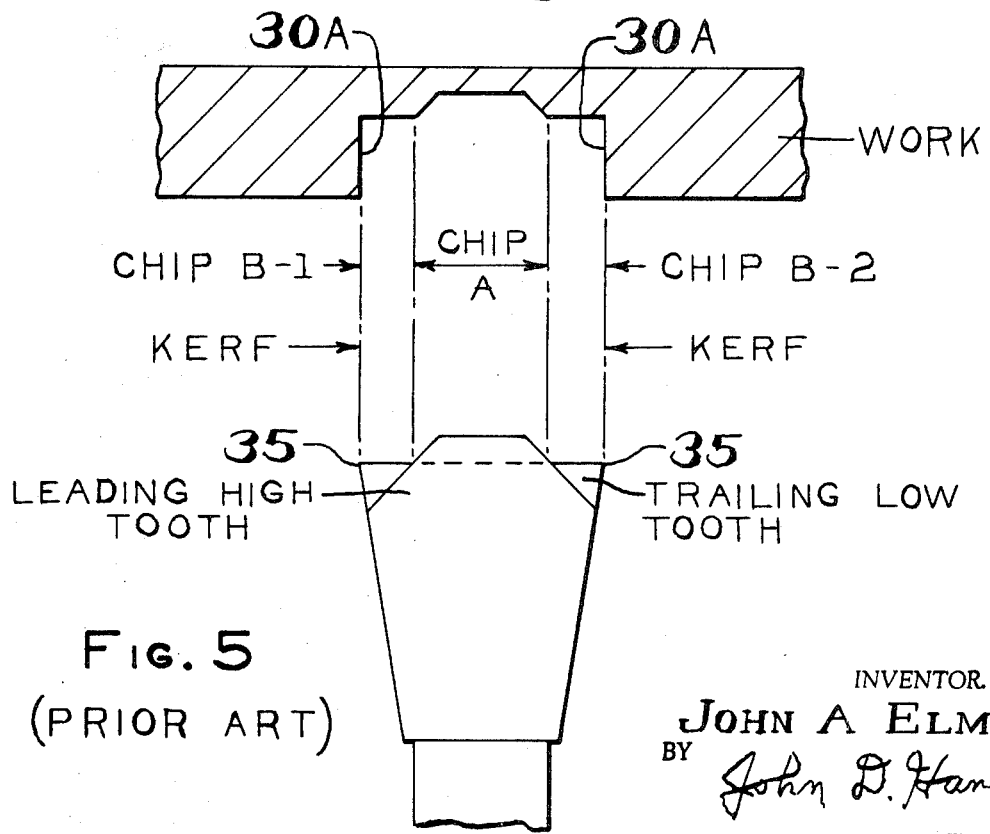
FIG. 5 is a diagram similar to FIG. 4 but showing the corresponding three-chip cutting action of the triple-chip-type saws of the prior art.

The five-chip cutting action of this improved saw can best be understood by contrasting the diagram in FIG. 4 with the diagram of FIG. 5, the latter representing the cutting action of the prior art triple-chip-type saws.

Referring to FIG. 4, the three chips removed by the leading high tooth A are removed from the kerf of the workpiece in the regions indicated by the dimensional arrows. These consist of a chip removed from the center region marked "chip A-1" and two much narrower chips at the sides of the kerf marked "chip A-2" and "chip A-3." The cut surfaces of the work are indicated at reference numerals 30—30. The center chip region A-1 is removed by the edge 14 of tooth A together with the portions of the beveled edges 16 immediately flanking edge 14. The chip regions A-2 and A-3 are formed by the portions of leading tooth A between the edges 20 and the immediately adjoining portion of its beveled faces 16 which are outside the envelope of the trailing tooth B. The two remaining chip areas B-1 and B-2 of the kerf in the work shown in FIG. 4 are removed by the portions of radial outer edge 15 of each tooth B which adjoin the lateral corners 28—28 of tooth B. These regions of edge 15 remove chips in region B-1 and B-2.

In FIG. 4, it will be understood that the basic function of the saw is to cut entirely through the workpiece and not to form a groove as shown in the workpiece of FIG. 4, however, would reasonably represent the kerf profile at the interface of the teeth and the uncut portion of the work immediately in front of the cutting teeth.

In contrast to the five-chip cutting action shown in FIG. 4, the triple-chip-type saws of the prior art as diagramed in FIG. 5 operate so that the leading high tooth A removes a wide center chip in the region marked "chip-A" of the kerf. The trailing tooth B removes chips in the regions marked "chip B-1" and "chip B-2." The cut surfaces in the latter diagram indicated by numerals 30A—30A are formed by the lateral outer corners 35—35 of the trailing low tooth B. Owing to the keystone configuration of the low tooth B, the corners 35—35 are necessarily sharp corners (less than 90°) which are believed to form a series of striations along the cut edges 30A—30A unlike the cutting action obtained by the broader angle corners 20—20 of the leading tooth A as shown in FIG. 2 and 3.

By comparing FIGS. 4 and 5, it will be seen that a triple-chip-type saw may be easily converted to a five-chip type provided by this invention be merely forming the diverging lateral sides of the low trailing tooth so that they are offset inwardly from the corresponding faces of the leading high tooth.

This relatively simple structural change remarkably improves the quality of the cut surfaces of the work. For example, a five-chip-type saw in accordance with this invention is capable of providing a 10 RMS surface finish on the cut surfaces of an aluminum extrusion. In contrast, a triple-chip-type saw of corresponding size when operated in exactly the same manner in the same aluminum material is capable of providing only a 60 RMS finish on the cutting surface. Moreover, the triple-chip saw leaves unsightly burrs on the cut edges of the work requiring secondary finishing operations to remove, whereas the saw of this invention makes its cut essentially burr free.

I claim:

1. A circular cutter such as a saw having a hard disclike body with pairs of cutting teeth at its periphery, each pair of teeth having a leading high tooth (A), and a trailing low tooth (B), each leading high tooth (A) having a radially outer cutting edge (14) and two lateral cutting corners (20—20) for removing three separate chips from a kerf of a workpiece, and each trailing low tooth (B) having two lateral cutting corners (28—28) inside the lateral envelope of said lateral cutting corners (20—20) of its associated high tooth but projecting radially beyond said lateral cutting corners (20—20) of said high tooth for removing two other separate chips from the kerf of a workpiece.

2. A circular cutter according to claim 1 wherein said teeth are inserts of material harder than the body of said cutter.

3. A circular cutter according to claim 2 wherein said teeth are inserts of carbide material.